United States Patent [19]

Agrawal et al.

[11] Patent Number: 6,006,223

[45] Date of Patent: Dec. 21, 1999

[54] MAPPING WORDS, PHRASES USING SEQUENTIAL-PATTERN TO FIND USER SPECIFIC TRENDS IN A TEXT DATABASE

[75] Inventors: Rakesh Agrawal; Ramakrishnan Srikant, both of San Jose, Calif.; Brian Scott Lent, Union City, Wash.

[73] Assignee: International Business Machines Corporation, Armonk, N.Y.

[21] Appl. No.: 08/909,911

[22] Filed: Aug. 12, 1997

[51] Int. Cl.$^6$ .................................................... G06F 17/30
[52] U.S. Cl. ...................... 707/5; 707/3; 707/6; 707/102; 707/203; 707/511; 707/532
[58] Field of Search .................. 707/1, 2, 3, 6, 707/7, 8, 9, 10, 100, 203, 101, 102, 103, 201, 511, 531, 532, 535; 705/10; 704/1, 8, 9, 10

[56] References Cited

U.S. PATENT DOCUMENTS

| | | | |
|---|---|---|---|
| 5,615,341 | 3/1997 | Agrawal et al. ............................ | 705/10 |
| 5,675,819 | 10/1997 | Schuetze .................................... | 704/10 |
| 5,729,730 | 3/1998 | Wlaschin et al. ........................... | 707/3 |
| 5,787,386 | 7/1998 | Kaplan et al. ............................... | 704/8 |
| 5,790,848 | 8/1998 | Wlaschin .................................... | 707/201 |
| 5,794,178 | 8/1998 | Caid et al. ................................... | 704/9 |

OTHER PUBLICATIONS

Osmar R Zaiane et al., discovering web access patterns and trends by applying OLAP and data mining technology on web logs, IEEE Apr. 1998, and 19–29.

Ming–Syan Chen, et al.,. efficient data mining for traversal patterns, IEEE Apr. 1998 and 209–221.

Mika Klemettinen et al., a data mining methodology and its application to semi–automatic knowledge acquistion, IEEE Sep. 1997 and 670–677.

Feldman R. et al., "Knowledge Discovery in Textural Databases (KDT)", Proc. of the 1st Int'l Conf. on Knowledge Discovery in Databases (KDD) and Data Mining, 1995 and Bar–Ilan University, Israel, Math and Computer Science Dept., KKD–95, pp. 112–117.

Feldman, R. et al., "Mining Associations in Text in the Presence of Background Knowledge", Proc. of the 2nd Int'l. Conf. on Knowledge Discovery on Databases and Data Mining, 1996. and Technology Spotlight / Spatial, Temporal & Multimedia Data Mining, pp. 343–346 (undated).

(List continued on next page.)

*Primary Examiner*—Wayne Amsbury
*Assistant Examiner*—Srirama Channavajjala
*Attorney, Agent, or Firm*—Gray Cary Ware Freidenrich

[57] ABSTRACT

A method and apparatus for mining text databases, employing sequential pattern phrase identification and shape queries, to discover trends. The method passes over a desired database using a dynamically generated shape query. Documents within the database are selected based on specific classifications and user defined partitions. Once a partition is specified, transaction IDs are assigned to the words in the text documents depending on their placement within each document. The transaction IDs encode both the position of each word within the document as well as representing sentence, paragraph, and section breaks, and are represented in one embodiment as long integers with the sentence boundaries. A maximum and minimum gap between words in the phrases and the minimum support all phrases must meet for the selected time period may be specified. A generalized sequential pattern method is used to generate those phrases in each partition that meet the minimum support threshold. The shape query engine takes the set of phrases for the partition of interest and selects those that match a given shape query. A query may take the form of requesting a trend such as "recent upwards trend", "recent spikes in usage", "downward trends", and "resurgence of usage". Once the phrases matching the shape query are found, they are presented to the user.

16 Claims, 6 Drawing Sheets

OTHER PUBLICATIONS

Renouf, A., "Making Sense of Text: Automated Approaches to Meaning Extraction", 17th Int'l . On–Line Information Meeting Proceedings / Online Information 93, p. 77–87, England, Dec. 1993.

Srikant, R., et al., "Mining Sequential Patterns: Generalizations and Performance Improvements", Proc. of the 5th Int'l. Conf. on Extending Database Technology (EDBT), 1996, pp. 3–17.

Deerwester, S. et al., "Indexing by Latent Semantic Analysis", *Journal of the American Society for Information Science,* 41(6):391–407, 1990.

Croft, W., et al. "The Use of Phrases and Structured Queries in Information Retrevial", 14th Int'l. ACCM SIGIR Conf. on Research and Development on Information Retrieval, 1991 and ACM 0–89791–448, pp. 32–45, 1991.

Agrawal, R. et al., "Fast Algorithms For Mining Association Rules", Proceedings of the 20th VLDB Conference Santiago, Chile, pp. 487–499, 1994.

Agrawal, R. et al., "Active Data Mining", IBM Almaden Research Center, California, 6 pages, (undated Abstract).

Agrawal, R. et al., "Querying Shapes of Histories" Proceedings of the 21st VLDB Conference, Zurich, Switzerland, 13 pages, 1995.

Agrawal, R. et al., "Mining Sequential Patterns", *IEEE* (1063–6382), pp. 3–14, 1995.

FIG. 2
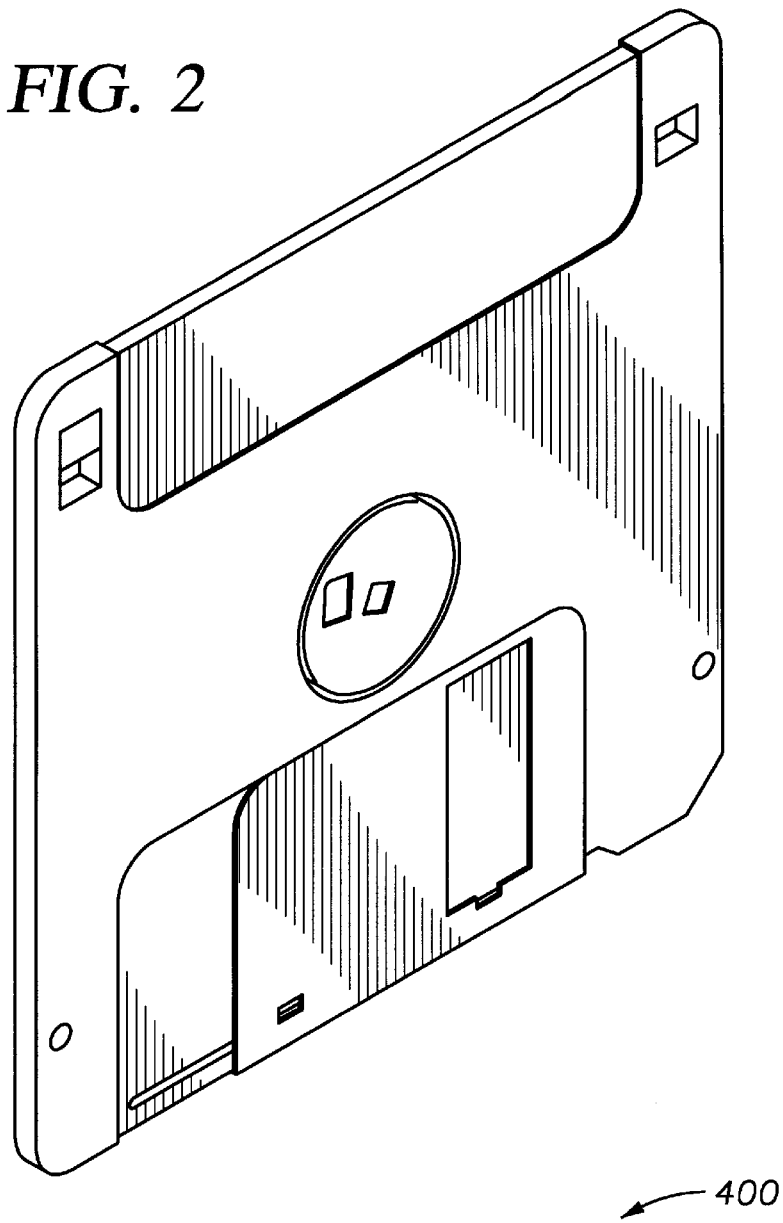
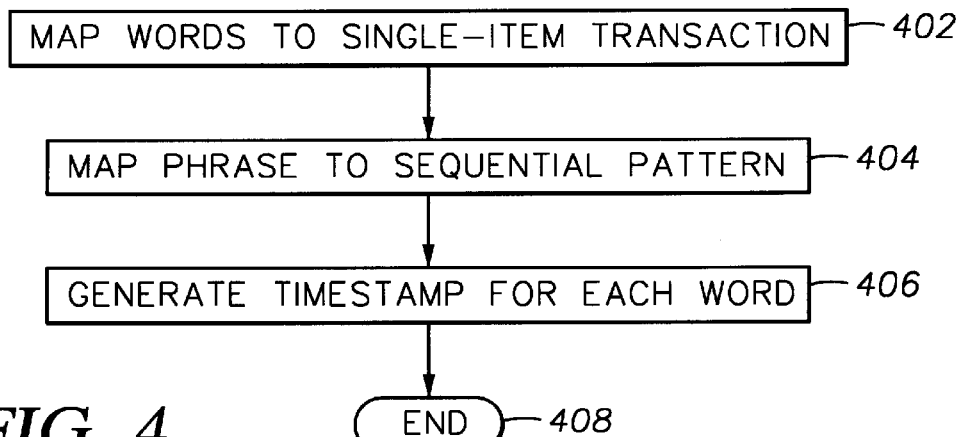
FIG. 4

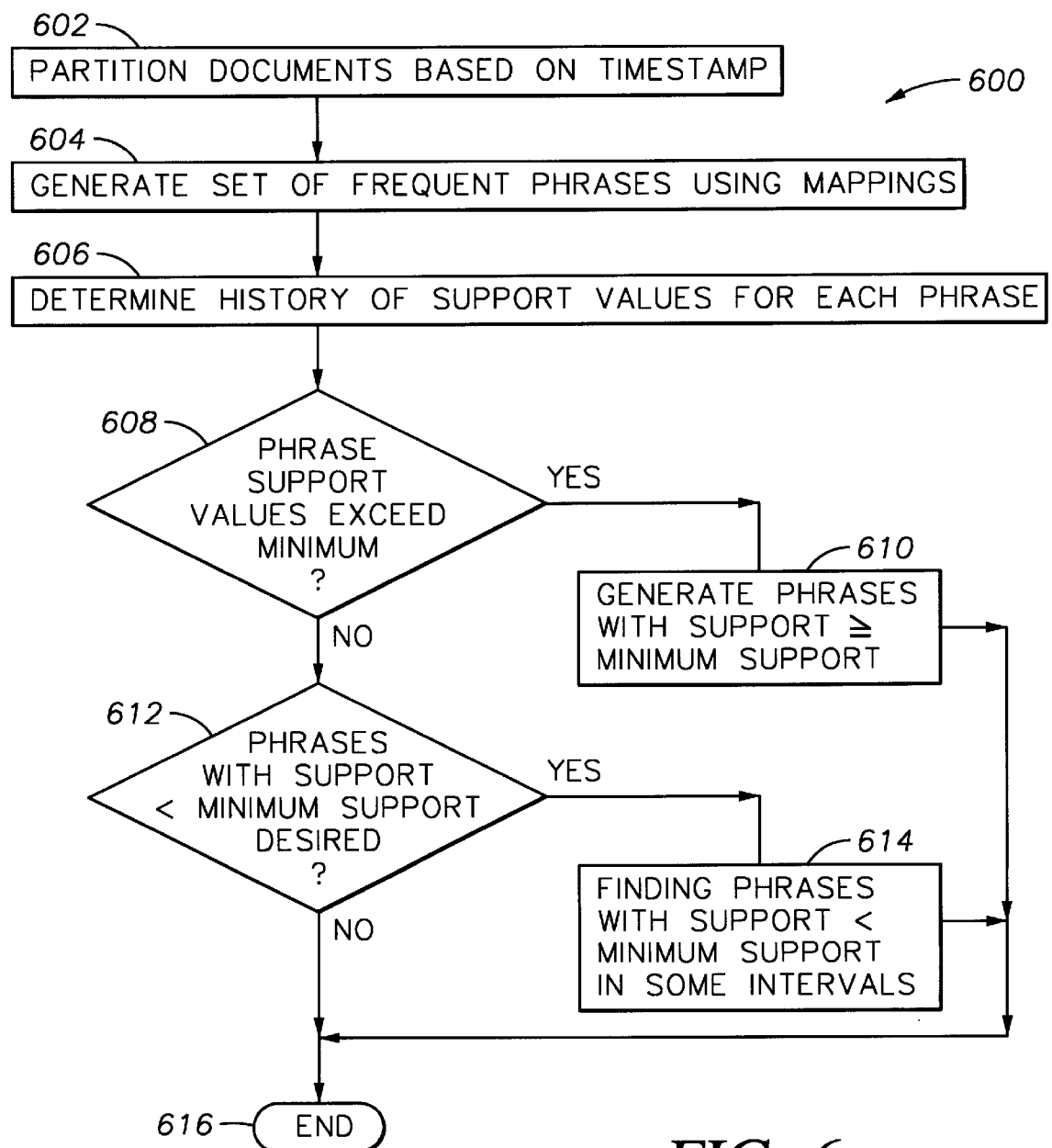

| %SUPPORT | 0-PHRASE |
|---|---|
| 1.72 | (WATER) (COOLED) (NUCLEAR) (REACTOR) |

| | |
|---|---|
| 7.85 | (WATER) (NUCLEAR) (REACTOR) |
| 6.87 | (REACTOR) (PRESSURE) (VESSEL) |
| 5.10 | (NUCLEAR) (POWER) (PLANT) |
| 4.41 | (NUCLEAR) (REACTOR) (FUEL) |
| 3.61 | (COOLED) (NUCLEAR) (REACTOR) |
| 3.44 | (NUCLEAR) (REACTOR) (CORE) |
| 2.12 | (WATER) (COOLED) (NUCLEAR) |
| 1.37 | (SPENT) (NUCLEAR) (FUEL) |
| 1.32 | (REACTOR) (COOLANT) (SYSTEM) |
| 1.20 | (FUEL) (ROD) (CLADDING) |
| 1.15 | (NUCLEAR) (REACTOR) (PLANT) |
| 1.03 | (CONTAINING) (NUCLAR) (FUEL) |
| 1.03 | (LIQUID) (METAL) (COOLANT) |
| 0.97 | (WATER) (NUCLEAR) (REACTOR) |
| 0.97 | ((NUCLEAR) (FISSION) (REACTOR) |
| 0.80 | (FUEL) (ROD) (ASSEMBLY) |
| 0.69 | (LENGTH) (FUEL) (RODS) |
| 0.69 | (TOP) (TIE) (PLATE) |
| 0.69 | (CORE) (SUPPORT) (PLATE) |
| 0.63 | (FUEL) (ROD) (SUPPORT) |
| 0.57 | (CONTROL) (ROD) (ASSEMBLY) |
| 0.57 | (REACTOR) (COOLANT) (WATER) |
| 0.52 | (ZIRCONIUM) (BASED) (ALLOY) |
| 0.52 | (ELONGATED) (NUCLEAR) (FUEL) |
| 0.52 | (EMERGENCY) (CORE) (COOLING) |
| 0.52 | (REACTOR) (CONTAINMENT) (VESSEL) |

| | |
|---|---|
| 47.08 | (NUCLEAR) (REACTOR) |
| 24.97 | (FUEL) (ASSEMBLY) |
| 24.86 | (NUCLEAR) (FUEL) |
| 21.08 | (FUEL) (RODS) |
| 15.18 | (FUEL) (ROD) |
| 15.12 | (REACTOR) (CORE) |
| 11.17 | (PRESSURE) (VESSEL) |
| 10.48 | (WATER) (REACTOR) |
| 9.85 | (REACTOR) (VESSEL) |
| 9.16 | (CONTROL) (ROD) |
| 8.59 | (FUEL) (ASSEMBLIES) |
| 7.39 | (REACTOR) (PRESSURE) |

*FIG. 7A*

| %SUPPORT | 0-PHRASE |
|---|---|
| 47.08 | (NUCLEAR) (REACTOR) |
| 4.41 | (NUCLEAR) (REACTOR) (FUEL) |
| 3.44 | (NUCLEAR) (REACTOR) (CORE) |
| 1.15 | (NUCLEAR) (REACTOR) (PLANT) |
| 7.85 | (WATER) (NUCLEAR) (REACTOR) |
| 0.97 | (WATER) (NUCLEAR) (REACTOR) |
| 3.61 | (COOLED) (NUCLEAR) (REACTOR) |
| 1.72 | (WATER) (COOLED) (NUCLEAR) (REACTOR) |
| 21.08 | (FUEL) (RODS) |
| 15.18 | (FUEL) (ROD) |
| 1.20 | (FUEL) (ROD) (CLADDING) |
| 0.63 | (FUEL) (ROD) (SUPPORT) |
| 0.80 | (FUEL) (ROD) (ASSEMBLY) |
| 7.39 | (REACTOR) (PRESSURE) |
| 6.87 | (REACTOR) (PRESSURE) (VESSEL) |
| 24.86 | (NUCLEAR) (FUEL) |
| 1.37 | (SPENT) (NUCLEAR) (FUEL) |
| 1.03 | (CONTAINING) (NUCLEAR) (FUEL) |
| 24.97 | (FUEL) (ASSEMBLY) |
| 8.59 | (FUEL) (ASSEMBLIES) |
| .......... | |

*FIG. 7B*

| PHRASE | SHAPE QUERY |
|---|---|
| 1. (NUCLEAR) (POWER) (PLANT) | (UP UP UP) |
| 2. (CONTAINMENT) (VESSEL) | (UP UP UP) |
| 3. (REACTOR) (POWER) | (UP UP UP) |
| 4. (FUEL) (ROD) (ASSEMBLY) | (DOWN DOWN DOWN) |
| 5. (SPENT) (NUCLEAR) (FUEL) | (DOWN DOWN DOWN) |

*FIG. 8*

MAPPING WORDS, PHRASES USING SEQUENTIAL-PATTERN TO FIND USER SPECIFIC TRENDS IN A TEXT DATABASE

BACKGROUND OF THE INVENTION

1. Field of the Invention

The present invention relates to discovering trends in text databases. More particularly, the invention concerns the analysis of databases to find user specified trends in documenting text by employing phrase identification using sequential patterns and trend identification using shape queries.

2. Description of the Related Art

Database technology has been used with great success in traditional business data processing. However, there is a increasing desire to use this technology in new application domains. For example, one such application domain that has acquired considerable significance is that of database text analysis (sometimes referred to as "mining").

Several approaches to different database content analysis techniques have been proposed as discussed in Feldman et al., "Knowledge Discovery in Textual Databases (KTD)", *Proc. of the 1st Int'l. Conf. on Knowledge Discovery in Databases and Data Mining,* 1995; Feldman et al., "Mining Associations in Text in the Presence of Background Knowledge", *Proc. of the 2nd Int'l. Conf. on Knowledge Discovery on Databases and Data Mining* 1996; Renouf, A., "Making Sense of Text: Automated Approaches to Meaning Extraction", 17*th Int'l. On-Line Information Meeting Proceedings,* 1993a; Srikant et al., "Mining Sequential Patterns: Generalizations and Performance Improvements", *Proc. of the 5th Int'l. Conf. on Extending Database Technology (EDBT),* 1996. As new database content analysis techniques are discovered, an increasing number of organizations are creating ultra large databases (measured in gigabytes and even terabytes) of business data, such as consumer data, transactional histories, sales records, and historical documents. For example, U.S. patents dating from 1970 may now be found in a computer database which forms a potential gold mine of valuable business information.

A few suggestions have been made by database content analysis practitioners concerning discovering interesting patterns and trend analyses on text documents. For example, analyzing trends involving the comparison of concept distributions using old data with distributions using new data has been suggested in Feldman, 1995, supra. In Feldman, 1996, supra, associations between the key words or concepts labeling documents using background knowledge about relationships among the key words is described. The knowledge base is used to supply unary or binary relations amongst the key words labeling the documents.

More specifically, using words and phrases to describe themes and concepts in text documents is now being studied by the information retrieval community. For example, mathematical models treating word associations as weighted vectors that represent "concepts" found within documents has been proposed. This "vector" approach allows a query to identify and retrieve a document even when the query and the document share no words, but do share a similar concept. The technique is referred to as Latent Semantic Indexing (LSI) and is discussed in Deerwester et al., "Indexing by Latent Semantic Analysis", *Journal of the American Society for Information Science,* 41(6):391–407, 1990. However, one problem with the LSI model is the amount of time it takes to "build" the model.

The use of words and phrases to build more advanced queries to discover trends in databases is of recent advent. Various techniques, such as identifying phrases as concepts and as relationships between concepts, where the quality of text categorization is improved by using word clusters and phrases, has been proposed. However, one problem in implementing such phrase-based database content analysis techniques is their implementation in existing databases. The database systems of today offer little functionality to support such "mining" applications, and machine learning techniques perform poorly when applied to very large databases. The difficulty in implementation of a phrase-based analysis method is one reason why the discovery of trends in text databases has not evolved as quickly as might be expected.

Although these trend-finding methods constitute a significant advance and in some instances enjoy commercial success today, the assignee of the present application has continually sought to improve the performance and efficiency of these data analysis systems. The problem with presently known methods is that trends in databases may not be easily and efficiently discovered using current techniques.

SUMMARY OF THE INVENTION

Broadly, the present invention concerns a method and apparatus used to discover trends in text databases. More particularly, the invention concerns the analysis of the contents of text databases to find user specified trends. The method employs sequential pattern phrase identification and uses shape queries to identify trends in the data.

In one embodiment, the invention may be implemented to provide a method to access and partition a database, identify words and phrases contained in text documents of the partition, and discover trends based upon the frequency with which the phrases appear. A practical example of the implementation of the present invention best summarizes the invention.

In the example, assume the present invention is connected to a database containing all granted U.S. patents. The patent data is retrieved using a dynamically generated Structured Query Language (SQL) query based upon selection criteria specified by the user. In one embodiment, the selection criteria may be specified by the user using a graphic user interface (GUI). The present invention allows the selection of patents in a specific classification or by key words appearing in the title or abstract of each patent in the database. Once retrieved, a histogram displaying the number of patents for each year may be shown on the GUI and the user may then "partition" the database, i.e., specify a range of years upon which the present invention will be implemented.

The user can also chose the maximum and minimum gap desired between words in the phrases to be mined as well as the minimum support all phrases must meet for each time period between the start and ending years. Once the user has specified a range upon which the method will focus, the text data contained within that range is "cleansed" in one embodiment to remove unwanted symbols and stop words. Transaction IDs are assigned to the words in the text documents depending on their placement within each document contained within the data range. The transaction IDs encode both the position of each word within the document as well as representing sentence, paragraph, and section breaks, and are represented in one embodiment as long integers with the sentence boundaries using the $10^3$ location, the paragraph boundaries using the $10^5$ location, and the section boundaries using the $10^7$ location. By specifying the minimum gap of $10^3$, for instance, phrases will consist of words each from different but sequential sentences.

Assuming partitioning and cleansing has occurred as discussed above, each partition containing patent documents is passed over by the present invention using a generalized sequential pattern method to generate those phrases in each partition that meet a minimum support threshold as specified by the user. The resulting phrases may be cached in one embodiment so that different shaped queries can be run using the data. The shape query engine used in the present invention takes the set of partitioned phrases and selects those that match the given shape query. In another embodiment, once a shaped-query has been defined either internally or using a graphical editor, the shape query is rewritten into a standard definition language (SDL). The SDL is used to determine user specified trends which are present in the partitioned database.

In another embodiment the user may define his own shape by using a visual shape editor. In any event, the query may take the form of requesting a trend in phrase usage in patents such as "recent upwards trend", "recent spikes in usage", "downward trends", and "resurgence of usage". Once the phrases matching the shape query are found, they are presented to the user via a visual display.

In another embodiment, the invention may provide an apparatus for implementing the invention. The apparatus may include a data processing device such as a mainframe computer using an operating system sold under trademarks such as MVS. The apparatus may also incorporate a database system or may access data on files located on a data storage medium such as disk.

In still another embodiment, the invention may be implemented to provide a signal-bearing medium tangibly embodying a program of machine-readable instructions executable by a digital data processing apparatus to perform a method for discovering trends from a database. The signal-bearing media may comprise various types of storage media, or other suitable signal-bearing media including transmission media such as digital, analog, or wireless communication links.

The invention affords its users with a number of distinct advantages. One advantage the invention provides is a method for discovering changing trends in a company's business philosophy. In other words, the company's shift in interest from one area to another may be discovered, thereby allowing the user to better anticipate the strategies of the company. Another advantage provided is that spikes, upward trends, downward trends, or any other user defined trend can be mined from a given text database. The invention also provides numerous other advantages and benefits, which should be apparent from the following description of the invention.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein:

FIG. 2 is a perspective view of an exemplary signal-bearing medium in accordance with one embodiment of the invention;

FIG. 4 is a flowchart of an operational sequence illustrating one embodiment of how frequent phrases are identified in task 306 of FIG. 3; and FIG. 5 is a table showing the minimum and maximum time gaps between each word in a 2-phrase implementation executed in accordance with one embodiment of the present invention.

FIG. 6 is a flowchart of an operational sequence illustrating one embodiment of how a history of frequent phrases is generated in task 308 of FIG. 3.

FIG. 7A is list of the phrases culled from a database in accordance with one embodiment of the present invention;

FIG. 7B is a pruned list of the phrases mined in FIG. 7B; and

FIG. 8 is a table showing the trends found from the phrases culled from a database using one embodiment of the present invention, the phrases being shown in FIG. 7A and FIG. 7B.

DETAILED DESCRIPTION OF THE PREFERRED EMBODIMENTS

Hardware Components & Interconnections

Figure 1:
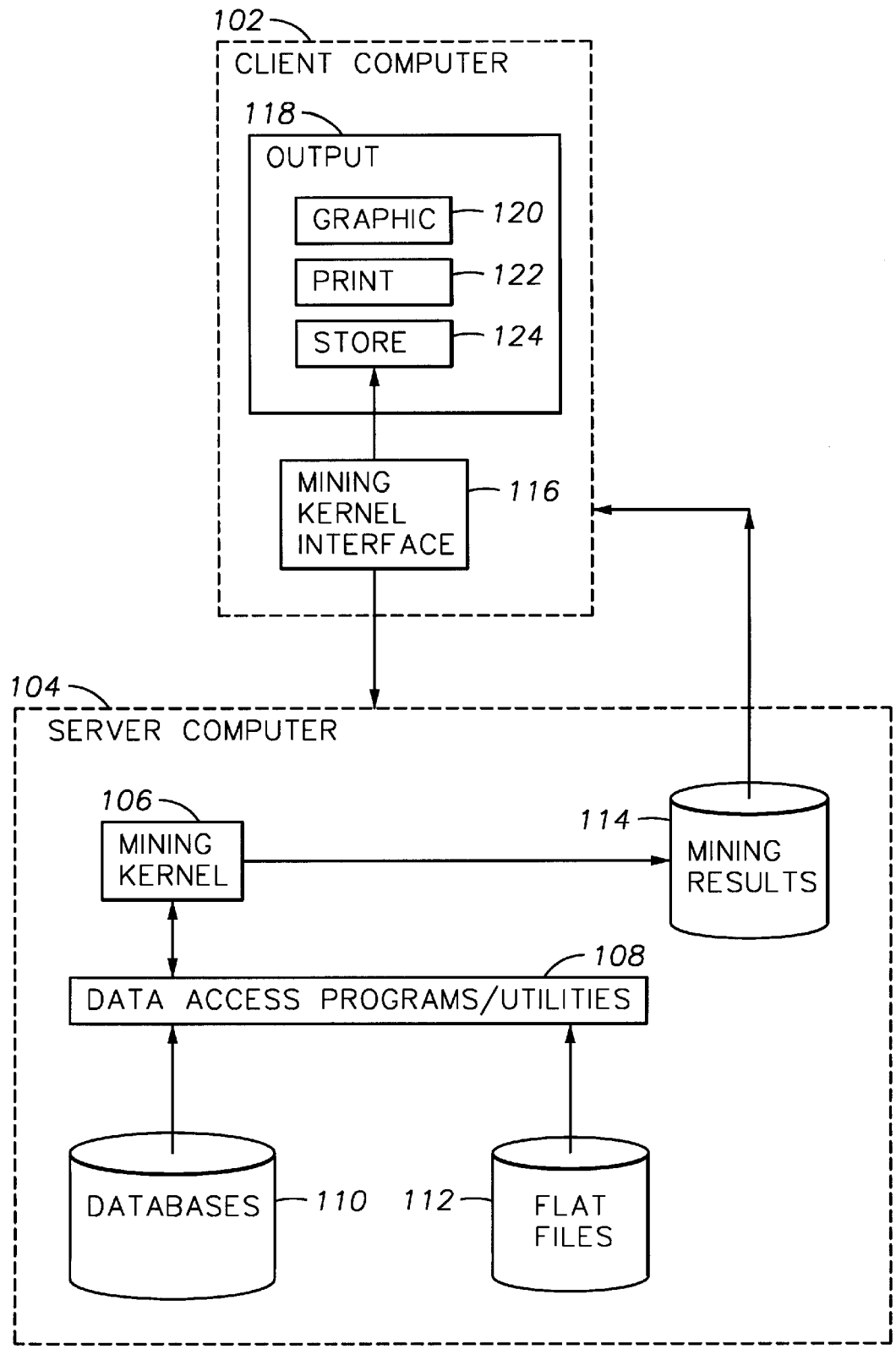
FIG. 1 is a block diagram of the hardware components and interconnections of a digital processing machine used to find trends in a database in accordance with one embodiment of the invention.

One aspect of the invention concerns a data processing system for extracting desired data relationships from a database, which may be embodied by various hardware components and interconnections as described in FIG. 1.

Digital Data Processing Apparatus

Referring to FIG. 1, a data processing system 100 for analyzing the contents of databases in order to discover desired data relationships is illustrated. In the architecture shown, the system 100 includes one or more digital processing apparatuses, such as a client computer 102 and a server computer 104. In one embodiment, the server computer 104 may be a mainframe computer manufactured by the International Business Machines Corporation of Armonk, N.Y., and may use an operating system sold under trademarks such as MVS. Or, the server computer 104 may be a Unix computer, or OS/2 server, or Windows NT server, or IBM RS/6000 530 workstation with a minimum of 128 MB of main memory running AIX 3.2.5. The server computer 104 may incorporate a database system, such as DB2 or ORACLE, or it may have data on files on some data storage medium such as disk, e.g., a 2 GB SCSI 3.5" drive, or tape.

FIG. 1 shows that, through appropriate data access programs and utilities 108, the mining kernel 106 accesses one or more databases 110 and/or flat files (i.e., text files) 112 which contain data chronicling transactions. After executing the steps described below, the mining kernel 106 outputs association rules it discovers to a mining results repository 114, which can be accessed by the client computer 102.

Additionally, FIG. 1 shows that the client computer 102 can include a mining kernel interface 116 which, like the mining kernel 106, may be implemented in suitable computer code. Among other things, the interface 116 functions as an input mechanism for establishing certain variables, including the minimum support value or minimum confidence value. Further, the client computer 102 preferably includes an output module 118 for outputting/displaying the mining results on a graphic display 120, print mechanism 122, or data storage medium 124.

Despite the specific foregoing description, ordinarily skilled artisans (having the benefit of this disclosure) will recognize that the apparatus discussed above may be implemented in a machine of different construction, without departing from the scope of the invention. As a specific example, one of the output components 118 may be eliminated; furthermore, the functions of the client computer 102 may be incorporated into the server computer 104, even though depicted separately in FIG. 1.

Operation

In addition to the various hardware embodiments described above, a different aspect of the invention concerns a method for discovering trends in text databases.

Signal-Bearing Media

Such a method may be implemented, for example, by operating the system 100 to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to discover trends in databases.

This signal-bearing media may comprise, for example, RAM (not shown) contained within the system 100. Alternatively, the instructions may be contained in another signal-bearing media, such as a magnetic data storage diskette 200 as shown in FIG. 2, directly or indirectly accessible by the system 100. Whether contained in the system 100 or elsewhere, the instructions may be stored on a variety of machine-readable data storage media, such as DASD storage (e.g., a conventional "hard drive" or a RAID array), magnetic tape, electronic read-only memory (e.g., CD-ROM or WORM), an optical storage device (e.g., WORM), paper "punch" cards, or other suitable signal-bearing media including transmission media such as digital and analog and communication links and wireless. In an illustrative embodiment of the invention, and not by way of limitation the machine-readable instructions may comprise lines of compiled $C^{+-}$ language code.

Overall Sequence of Operation

Figure 3:
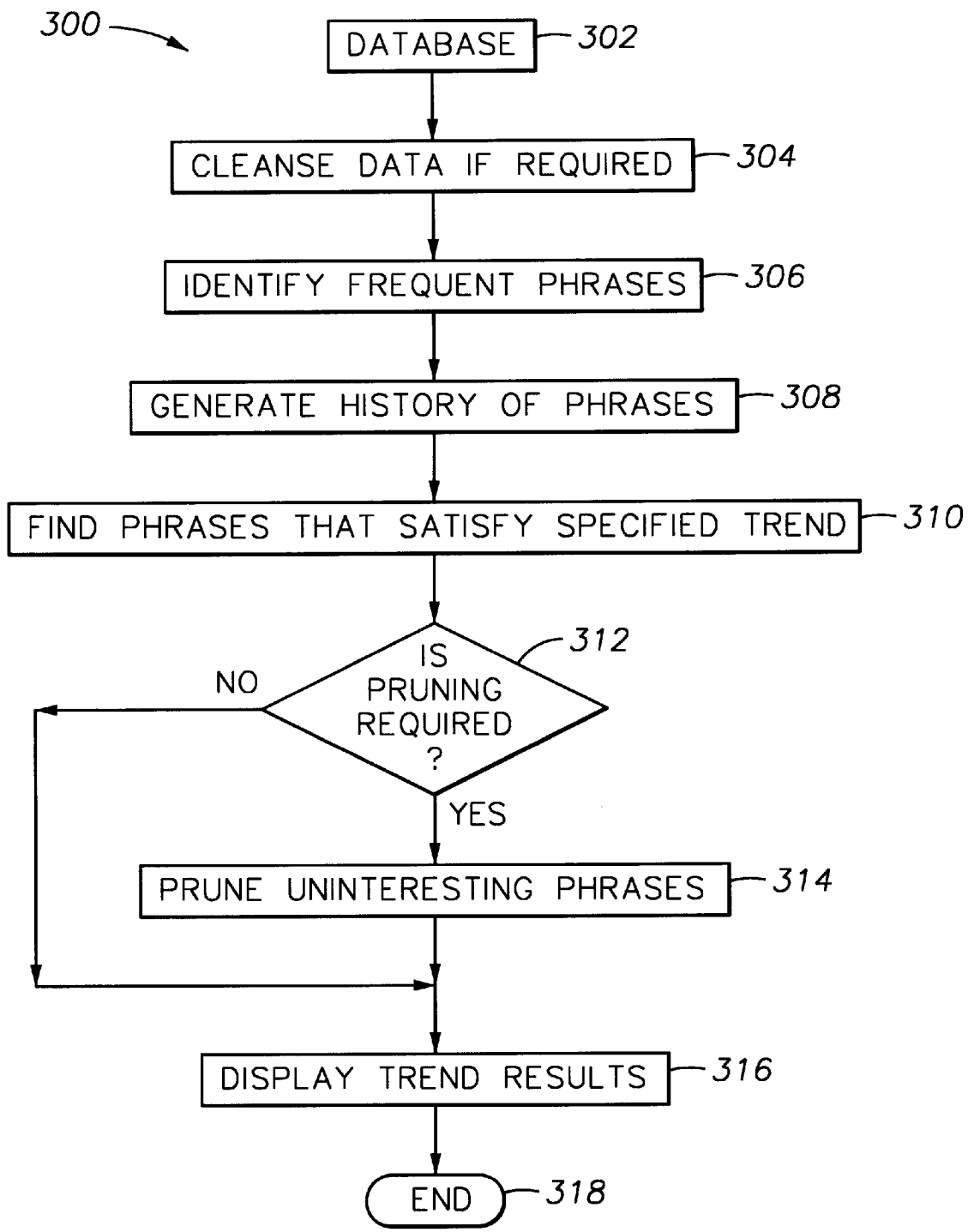
FIG. 3 is a flowchart of an operational sequence illustrating the basic implementation of the present invention.

FIG. 3 shows a sequence of method steps 300 to illustrate one example of the method aspect of the present invention. For ease of explanation, but without any limitation intended thereby, the example of FIG. 3 is described in the context of the system 100 described above. The steps are initiated in step 302, when a desired database is accessed.

Using the database, the mining kernel 106 may initiate a database cleansing routine in step 304 to remove unwanted symbols and stop words. These symbols and stop words may represent informational data that is included in the database, but is not needed or obstructs performance of the method of the present invention. At the same time the database is being cleansed, "transaction IDs" may be assigned by the mining kernel 106 to the words comprising the database depending on their placement within a subsection of the data. The transaction IDs encode both the position of each word within the subsection of the database as well as representing sentence, paragraph, and section breaks. Using the transaction IDs the identity of frequent phrases appearing in the database are determined in step 306. Furthermore, the database may be partitioned by the user so that only data for a specified period or other characteristic is considered by the current trend discovering invention.

For example, for each partition of cleansed data, a pass may be made over the partitioned data using a general sequential pattern algorithm such as that found in Srikant et al, "Mining Sequential Patterns: Generalizations and Performance Improvements", *Proc. of the 5th Int'l. Conf. on Extending Database Technology (EDBT)*, 1996. The pass over the data is used to generate those phrases in each partition that meet a user specified minimum support threshold. The mining kernel 106 may be used in determining minimum support values, where support equates to the number of times a word or phrase is present in a document in the data partition compared to the overall number of times the word or phrase appears in the entire data partition. A history of the phrases is generated by the mining kernel 106 in step 308 and cached so that different "shape queries", as described below, can be run against the data. The shape query is implemented in step 310 to take the set of partition phrases of interest and select those phrases that match the given shape of the query. A shape query may be defined in various ways, known in the art, such as internally using computer programming or using a graphical editor. Once a shape query has been defined, a rewriting of the query into SDL is performed by the mining kernel 106. One example of a method for rewriting a query into SDL is set forth in Agrawal et al, "Querying Shapes of Histories", *Proc. of the 21st Int'l. Conf. on Very Large Databases (VLDB)*, 1995.

In step 312, "pruning" of the phrases which meet the requirements of the shape query may be performed. Pruning refers to the elimination of phrases which are not of interest to the user, and are deemed "uninteresting". If pruning is desired, in step 314 the pruning may comprise dropping non-maximal phrases when their support is near that of a maximal phrase that is a superset of the phrases discovered. A maximal phrase is a phrase that has maximum support in the data partition. In another embodiment, the pruning of step 314 may involve the use of a syntactic hierarchial ordering of phrases. The idea is that if a phrase X is a syntactic subphrase of a phrase Y, then the concept corresponding to X is usually a generalization of the concept corresponding to phrase Y. Such an ordering allows users to explore lower-level concepts by selecting some of the non-maximal phrases, being that users of the invention would initially see only the most general concepts. Regardless of whether pruning in step 314 occurs or not, the results of the database mining of the method 300 are displayed in step 316. The results may be displayed on various mediums as described above relative to output module 118 of FIG. 1. The method ends in step 318.

In one embodiment, phrase-identification as used in the current invention in step 306 involves in a general sense the mining of generalized sequential patterns. The discovery of generalized sequential patterns is discussed in Srikant et al., "Mining Sequential Patterns: Generalizations and Performance Improvements", *Proc. of the 5th Int'l. Conf. on Extending Database Technology (EDBT)*, 1996. In discovering generalized sequential patterns, a set of sequences, called data-sequences, is used. Each data-sequence is a list of transactions, where each transaction is a set of items commonly called literals. For example, [(3) (4 5) (7)] is a sequence where (3), (4 5), and (7) are each transactions. The present invention uses a sequential pattern which consists of a list of sets of items, where each set of items is called an element of the pattern. The support of a sequential pattern is the percentage of data-sequences that contain the pattern. The present invention finds all sequential patterns whose support is greater than a user-specified minimum support. Furthermore, a time constraint is used that specifies a minimum and/or maximum time period between adjacent elements in a pattern. As discussed below, the time constraints can be specified by the end user. In addition, items in an element of the sequential pattern can be present in a set of transactions which have a timestamp and may be within a user-specified time window rather than in a single transaction.

One embodiment of a phrase identifying method 400 is illustrated in FIG. 4 and describes in greater detail how frequent phrases are identified in step 306 of FIG. 3. The following discussion relates to the mapping of words to single item transactions as indicated in step 402 and the mapping of phrases to sequential patterns as noted in step 404. Essentially, a word w is denoted by (w) and a phrase p by $[(w_1)(w_2)\ldots(w_n)]$. It is intended in the present invention that the definition of a "phrase" is defined with considerable latitude. For example, a phrase can be defined to be a consecutive list of words, a list of words that are contained in a single sentence, or a list of words where each word is from a different sentence but within a single paragraph. However, in another embodiment the term phrase may take on other embodiments as defined by the user in trying to find specific information by implementing the present invention.

The mapping of words in step 402 may comprise in one embodiment mapping a word in a text field ("document") to a single-item transaction in a data-sequence. A phrase may be mapped to a sequential pattern that has just one item in each element. A "timestamp" for each word—specifying both the order of occurrences of the words in the document and the locations of the words relative to grammatical sections of the document, such as sentence and paragraphs—is generated in step 406. For example, the timestamp may be incremented by 1 for successive words in a sentence, by 1000 when crossing a sentence boundary, by $10^5$ for a paragraph boundary, and $10^7$ for a section boundary. This mapping—running the sequential patterns with a maximum gap of 1—generates phrases that are a list of consecutive words. If the maximum gap in the timestamp were set to 1000, phrases that are a list of (possibly non-consecutive) words from a single sentence would be generated. Setting the minimum gap of the timestamp to 1000 and the maximum gap of the timestamp to $10^5$ would generate a list of words, each from a different sentence, but within a single paragraph.

In a further embodiment, phrases with more complex structures may be defined using a 1-phrase as a list of elements where each element is itself a phrase, and a k-phrase has an iterated list of phrases with k levels of nesting. For instance, a 1-phrase could be [[(IBM)](data)(mining)]]. Based on user-specified parameters this phrase may correspond to "IBM" and "data mining" occurring in a single paragraph, with "data mining" being contiguous words in the paragraph. A k-phrase where k=2 could be [[(IBM)][(data)(mining)]][[(Anderson)(Consulting]], where "Anderson Consulting" occurs in a different paragraph from "IBM" and "data mining" but in the same section. The k=2 signifies the number of words in the phrase. For example, the 2-phrase uses the "words" [[(IBM)] and [(data)(mining)]] with [[(Anderson)(Consulting)]]. To find such complex k-phrases the method of the present invention may be enhanced to a allow a different maximum and minimum time gap between each pair of adjacent elements in the suggested pattern. To illustrate, FIG. 5 shows the minimum and maximum time gaps in the two-word phrase (2-phrase) example given above, assuming that it is desired that the whole pattern occur within a single section of a document. After the words and phrases have been mapped and the time step generated, the method of FIG. 4 ends in step 408.

FIG. 6 illustrates in greater detail the method followed in one embodiment of step 308 of FIG. 3 for generating a history of frequent phrases. Generation of the history of phrases begins in step 602 when the documents contained in the database are partitioned by the mining kernel 106 based upon their timestamps. The "granularity" of the partitioning may be specified by the end user or may be set automatically by the method based upon user-defined criteria. For example, partitioning of the documents by year may be appropriate for patent data, whereas, partitioning by month may be more suitable for internet-related documents. For each partition, a set of frequent phrases is generated in step 604 as discussed above and includes the mapping techniques described above in steps 402 and 404 shown in FIG. 4. In step 606, the history of support values for each phrase is determined and may be cached for later use. The history of support values may be cached, for example, in the client computer 102, the server computer 104, or as otherwise indicated in the apparatus embodiments discussed in FIG. 2. When a particular phrase does not have minimum supported in a given partition, the phrases history will be empty for that time period. By maintaining a support history for each supported phrase, the set of histories may be queried at any time to select those phrases that have some specific shape in their histories. In the preferred embodiment, a shape definition language (SDL) such as set forth in Agrawal et al, supra, is used to define the user's queries and retrieve the associated data. In another embodiment, other well known SDLs may be used such as found in Kroft et al., "The Use of Phrases and Structured Queries in Information Retrieval", 14*th Int'l. ACM SIGIR Conf. on Research and Development on Information Retrieval,* 1991.

However, several benefits may be realized by using a shape query language such as SDL to identify trends. For example, the SDL language is small, yet powerful, allowing a rich combination of operators to be employed. Further, it is a straight forward step to rewrite a shape the user may define graphically into a set of SDL operators. Also, SDL allows a "blurry" query—a query defined by its shape and not the details of each interval of the shape—to be used if the user seeks information about an overall shape that does not care about the specific details of each interval of the shape. Finally, a shape query language such as SDL may be implemented efficiently since most of the operators of the language are designed to be "greedy" to reduce non-determinationism which in turn reduces the amount of back-tracking that may be required when searching across the history of support values. Greedy refers to an operator characteristic for including a broader array of related data on a given pass over the date.

Assuming the support value for the phrases exceed a user defined minimum in step 608, phrases with a support value greater than or equal to the minimum support are generated in step 610. If the phrase support values do not exceed the minimum, but the user wishes to review phrases with less than the minimum support value, as shown in step 612, phrases with a support value less than minimum support in all or in some of the intervals are found in step 614. The support for these phrases may be of interest to the user. Regardless, the phrases and/or their supports may be reviewed to identify trends, where a trend is simply the relationship established by those k-phrases selected using a shape query with the additional constraints of time periods in which the trend is supported. The method ends in step 616.

The following example illustrates trends found using the present invention from U.S. patents classified in the category "Induced Nuclear Reactions: Processes, Systems, and Elements". FIG. 7A lists the phrases found using the present invention, and FIG. 7B shows the hierarchial ordering of the phrases of FIG. 7A. The example phrases are the result of either a shaped-query which represented a steadily increasing trend of the phrase usage in recent years, or a trend of decreasing phrase usage in recent years. Without knowing the kind of patents filed in this category, the present invention found phrases and determined some of the popular topics of the recently granted patents in this category.

The top phrases found for U.S. patents in this category, classification 376, were generated using the pruning techniques discussed earlier in this application. As can be seen from FIG. 7A and FIG. 7B, the support value for each phrase is shown as a percentage in the left hand column with the 0-phrase represented in the right hand column. FIG. 7B shows the results of a user-specified ordering on the phrases in FIG. 7A. The ordering of FIG. 7B included a pruning step where the use of a syntactic hierarchial ordering of the phrases was implemented. Any phrase that was a syntactic subphrase of another phrase was eliminated. The ordering was performed because the syntactic subphrase was a generalization of a broader phrase included in FIG. 7A.

By way of example and not limitation, the trends desired by the user and derived from the phrases generated in FIG. 7B are shown in FIG. 8. Phrases 1 through 3 showed an increasing trend of usage, and phrases 4 and 5 showed descending usage.

Other Embodiments

While there have been shown what are presently considered to be preferred embodiments of the invention, it will be apparent to those skilled in the art that various changes and modifications can be made herein without departing from the scope of the invention as defined by the appended claims.

What is claimed is:

1. A computer executed method for discovering trends in a database, comprising:

mapping words in a plurality of words to a data-sequence of data contained in a data field and identifiable by a position identifier, the data-sequence having transactions where a transaction includes a set of items, a word mapped to a single-item transaction in a data-sequence;

mapping phrases to a sequential-pattern of data contained in the data field and identifiable by a position identifier, the sequential-pattern of data having sets of items, a phrase mapped to a sequential-pattern having one item in each set of items;

generating a time stamp for each word of a plurality of words mapped in a data field, the time stamp specifying a data field location;

partitioning the database into discrete portions using the time stamp for each word;

determining a support value for a phrase, the support value representing a number of data-sequences in a selected data partition containing the phrase; and outputting trends based upon the support values of the phrases, by:

determining frequent phrases using the mapping of each phrase, a phrase being frequent if the presence of the phrase in the selected partition of the database exceeds a minimum required support value; and outputting trends using only the frequent phrases.

2. The method recited in claim 1 where outputting trends further comprises pruning the frequent phrases based upon user-defined constraints to reduce the number of phrases used to identify trends.

3. The method recited in claim 1 including cleansing the database to remove undesired data from each data field.

4. The method recited in claim 1 including caching histories of the support values.

5. A signal-bearing medium tangibly embodying a program of machine-readable instructions executable by a digital processing apparatus to perform a method for discovering trends in a database, said method comprising:

mapping words in a plurality of words to a data-sequence of data contained in a data field and identifiable by a position identifier, the data-sequence having transactions where a transaction includes a set of items, a word mapped to a single-item transaction in a data-sequence;

mapping phrases to a sequential-pattern of data contained in the data field and identifiable by a position identifier, the sequential-pattern of data having sets of items, a phrase mapped to a sequential-pattern having one item in each set of items;

generating a time stamp for each word of a plurality of words mapped in a data field, the time stamp specifying a data field location;

partitioning the database into discrete portions using the time stamp for each word;

determining a support value for a phrase, the support value representing a number of data-sequences in a selected data partition contain the phrase; and outputting trends based upon the support values of the phrases, by:

determining frequent phrases using the mapping of each phrase, a phrase being frequent if the presence of the phrase in the selected partition of the database exceeds a minimum required support value; and outputting trends using only the frequent phrases.

6. The signal-bearing medium recited in claim 5 and used in performing a method for discovering trends in a database, where the method step of identifying trends further comprises pruning the frequent phrases based upon user-defined constraints to reduce the number of phrases used to identify trends.

7. The signal-bearing medium recited in claim 6 and used in performing a method for discovering trends in a database, the method including cleansing the database to remove undesired data from each data field.

8. The signal-bearing medium recited in claim 6 and used in performing a method for discovering trends in a database, the method including caching histories of the support values.

9. A digital processing machine used to discover trends in a database, the device comprising:

a database;

a digital processing apparatus, the digital processing apparatus configured to receive data and commands from a signal-bearing medium tangibly embodying a program of machine-readable instructions executable by the digital processing apparatus and used to perform a method for discovering trends in a database, said method comprising:

mapping words in a plurality of words to a data-sequence of data contained in a data field and identifiable by a position identifier, the data-sequence having transactions where a transaction includes a set of items, a word mapped to a single-item transaction in a data-sequence;

mapping phrases to a sequential-pattern of data contained in the data field and identifiable by a position identifier, the sequential-pattern of data having sets of items, a phrase mapped to a sequential-pattern having one item in each set of items;

generating a time stamp for each word of a plurality of words mapped in a data field, the time stamp specifying a data field location;

partitioning the database into discrete portions using the time stamp for each word;

determining a support value for a phrase, the support value representing a number of data-sequences in a selected data partition contain the phrase; and outputting trends based upon the support values of the phrases, by:

determining frequent phrases using the mapping of each phrase, a phrase being frequent if the presence of the phrase in the selected partition of the database exceeds a minimum required support value; and outputting trends using only the frequent phrases.

10. The machine recited in claim 9, where the method step of outputting trends performed by the digital processing apparatus further comprises pruning the frequent phrases based upon user-defined constraints to reduce the number of phrases used to identify trends.

11. The machine recited in claim 10, where the method performed by the digital processing apparatus includes cleansing the database to remove undesired data from each data field.

12. The machine recited in claim 11, where the method performed by the digital processing apparatus includes retaining histories of the support values.

13. A digital processing machine for discovering trends in a database, the device comprising:

a database;

a means for processing the database, the processing means configured to receive data and commands from a signal-bearing medium tangibly embodying a program of machine-readable instructions executable by the processing means and used to perform a method for discovering trends in a database, said method comprising: cleansing the database to remove undesired data from each data field;

mapping words in a plurality of words to a data-sequence of data contained in a data field and identifiable by a position identifier, the data-sequence having transactions where a transaction includes a set of items, a word mapped to a single-item transaction in a data-sequence;

mapping phrases to a sequential-pattern of data contained in the data field and identifiable by a position identifier, the sequential-pattern of data having sets of items, a phrase mapped to a sequential-pattern having one item in each set of items;

generating a time stamp for each word of a plurality of words mapped in a data field, the time stamp specifying a data field location;

partitioning the database into discrete portions using the time stamp for each word;

determining a support value for a phrase, the support value representing a number of data-sequences in a selected data partition contain the phrase; and outputting trends based upon the support values of the phrases, by:

determining frequent phrases using the mapping of each phrase, a phrase being frequent if the presence of the phrase in the selected partition of the database exceeds a minimum required support value; and outputting trends using only the frequent phrases.

14. The digital processing machine recited in claim 13 where outputting trends further comprises pruning the frequent phrases based upon user-defined constraints to reduce the number of phrases used to identify trends.

15. The digital processing machine recited in claim 13 including cleansing the database to remove undesired data from each data field.

16. The digital processing machine recited in claim 13 including caching histories of the support values.

* * * * *

UNITED STATES PATENT AND TRADEMARK OFFICE
CERTIFICATE OF CORRECTION

PATENT NO. : 6,006,223
DATED : December 21, 1999
INVENTOR(S) : Agrawal et al

It is certified that error appears in the above-identified patent and that said Letters Patent is hereby corrected as shown below:
On the title page, item

[75] Inventors: Change "Union City, Wash." to --Union City, Calif.--

Signed and Sealed this

Twenty-first Day of November, 2000

Attest:

Q. TODD DICKINSON

*Attesting Officer*     *Director of Patents and Trademarks*